(12) United States Patent
Tsai et al.

(10) Patent No.: US 6,464,514 B1
(45) Date of Patent: Oct. 15, 2002

(54) CARD EDGE CONNECTOR WITH GROUNDING PAD

(75) Inventors: Fu-Kai Tsai, Tu-Chen (TW); Edmond Choy, Union City, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/015,012

(22) Filed: Dec. 11, 2001

(51) Int. Cl.[7] .............................................. H01R 4/66
(52) U.S. Cl. ........................................ 439/92; 439/328
(58) Field of Search .................. 439/92, 101, 326–329, 439/152, 160, 153–159, 630–637

(56) References Cited

U.S. PATENT DOCUMENTS

| | | | | |
|---|---|---|---|---|
| 5,759,057 A | * | 6/1998 | Cheng et al. | 439/328 |
| 5,997,330 A | * | 12/1999 | Choy | 439/328 |
| 5,997,332 A | * | 12/1999 | Choy | 439/328 |
| 6,162,069 A | * | 12/2000 | Choy | 439/92 |

* cited by examiner

*Primary Examiner*—Hien Vu
(74) *Attorney, Agent, or Firm*—Wei Te Chung

(57) ABSTRACT

A card edge connector includes an insulative housing retaining conductive contacts soldered to a mother board. The housing defines a slot for receiving a daughter board engageable by the contacts for electrically connecting the daughter board to the mother board. Two side arms integrally extend from the housing, each having an inner face forming a platform for supporting the daughter board. A remote end section of each side arm forms a relatively rigid portion and a relatively flexible portion. A reinforcing member made of metal is attached to the remote end section of each side arm. The reinforcing member includes a side plate having a remote end from which a securing tab extends for interposing the relatively flexible portion therebetween and thus attaching the reinforcing member to the relatively flexible portion. A barbed tab extends from a proximal end of the side plate and is interferentially fit into a slit defined in the relatively rigid portion thereby securing the reinforcing member to the relatively rigid portion while allowing deflection of the relatively flexible portion with respect to the relatively rigid portion. A soldering pad extends from the barbed tab to be soldered to the mother board. A cantilever type spring arm extends from the soldering pad in an inclined fashion toward the housing. The spring arm forms an arc contact section projecting above the platform for effectively and compliantly engaging the daughter board.

5 Claims, 5 Drawing Sheets

CARD EDGE CONNECTOR WITH GROUNDING PAD

BACKGROUND OF THE INVENTION

1. Field of the Invention

The present invention generally relates to the field of electrical connector and more particular to a card edge connector for connecting a daughter board, such as a memory module, to a mother board.

2. The Related Arts

Memory modules that comprise memory chips mounted on a daughter board are often connected to a mother board of an electronic device, such as a personal computer, by means of a card edge connector, for example a memory socket connector. The card edge connector provides electrical connection between the daughter board and the mother board. An example of the memory socket is the so-called SO DIMM connector which allows the daughter board to be mounted to the mother board in such a way that the daughter board and the mother board are substantially parallel to each other. A leading edge of the daughter board is first inserted into the connector in an inclined fashion with a tailing edge of the daughter board located above the leading edge. The tailing edge of the daughter board is then pushed down to a final position.

To secure the daughter board in the final position, the card edge connector of this type is provided with latch means. A conventional connector of this type comprises a housing from opposite ends of which two side arms extend. The arms are integrally formed with the housing. Each arm forms a latch projection for engaging the daughter board. The housing and the arms are usually made of synthetic materials, such as plastics, which is in general mechanically weak. Namely the arms may be broken if they are over-deflected in receiving/withdrawing the daughter board.

Metal latches are also available in the art. Such metal latches comprise arms embedded in the synthetic material of the housing. This complicates the manufacturing thereof and increases costs.

Taiwan Patent Publication No. 87222119 discloses a further known type of latch means of the memory socket connector which is a combination of the metal latches and synthetic material latches. FIG. 5 of the attached drawings shows a housing of a memory socket connector. Arms 40 are integrally formed with the housing. A metal reinforcement member 41 is attached to one side of each arm 40. A soldering pad 42 extends from the metal reinforcement member 41 to be soldered to a mother board for further stabilizing the connector on the mother board. Such a design, although providing a solution the above problems, lacks of grounding to alleviate Electro-Magnetic Interference (EMI) to a daughter board received in the connector. In addition, no means is provided to prevent the daughter board from undesired translation caused by external vibration. U.S. Pat. No. 6,162,069 with one same inventor and the same assignee, discloses some approach, and the invention is to improve performance thereof.

It is thus desirable to provide a connector of the previously discussed type to overcome the above problems.

SUMMARY OF THE INVENTION

Accordingly, an object of the present invention is to provide a card edge connector comprising a grounding pad for suppressing EMI caused on a daughter board received in the card edge connector.

Another object of the present invention is to provide a card edge connector capable to retain a daughter board in position against movement caused by vibration.

A further object of the present invention is to provided a memory socket connector for connecting a memory module to a mother board, grounding path being formed between the memory module and the mother board for suppression of EMI to the memory module.

Yet a further object of the present invention is to provide a memory socket connector capable to securely retain a memory module therein without undesired translation caused by vibration.

To achieve the above objects, an electrical connector in accordance with the present invention comprises an insulative housing retaining conductive contacts soldered to a mother board. The housing defines a slot for receiving a daughter board engageable by the contacts for electrically connecting the daughter board to the mother board. Two side arms integrally extend from the housing, each having an inner face forming a platform for supporting the daughter board. A remote end section of each side arm forms a relatively rigid portion and a relatively flexible portion. A reinforcing member made of metal is attached to the remote end section of each side arm. The reinforcing member comprises a side plate having a remote end from which a securing tab extends for interposing the relatively flexible portion therebetween and thus attaching the reinforcing member to the relatively flexible portion. A barbed tab extends from a proximal end of the side plate and is interferentially fit into a slit defined in the relatively rigid portion thereby securing the reinforcing member to the relatively rigid portion while allowing deflection of the relatively flexible portion with respect to the relatively rigid portion. A soldering pad extends from the barbed tab to be soldered to the mother board. A cantilever type spring arm extends from the soldering pad in an inclined fashion toward the housing. The spring arm forms an arc contact section projecting above the platform for effectively and compliantly engaging the daughter board.

BRIEF DESCRIPTION OF THE DRAWINGS

The present invention will be to those skilled in the art by reading the following description of a preferred embodiment thereof, with reference to the attached drawings, in which.

DETAILED DESCRIPTION OF THE PREFERRED EMBODIMENT

Figure 1:
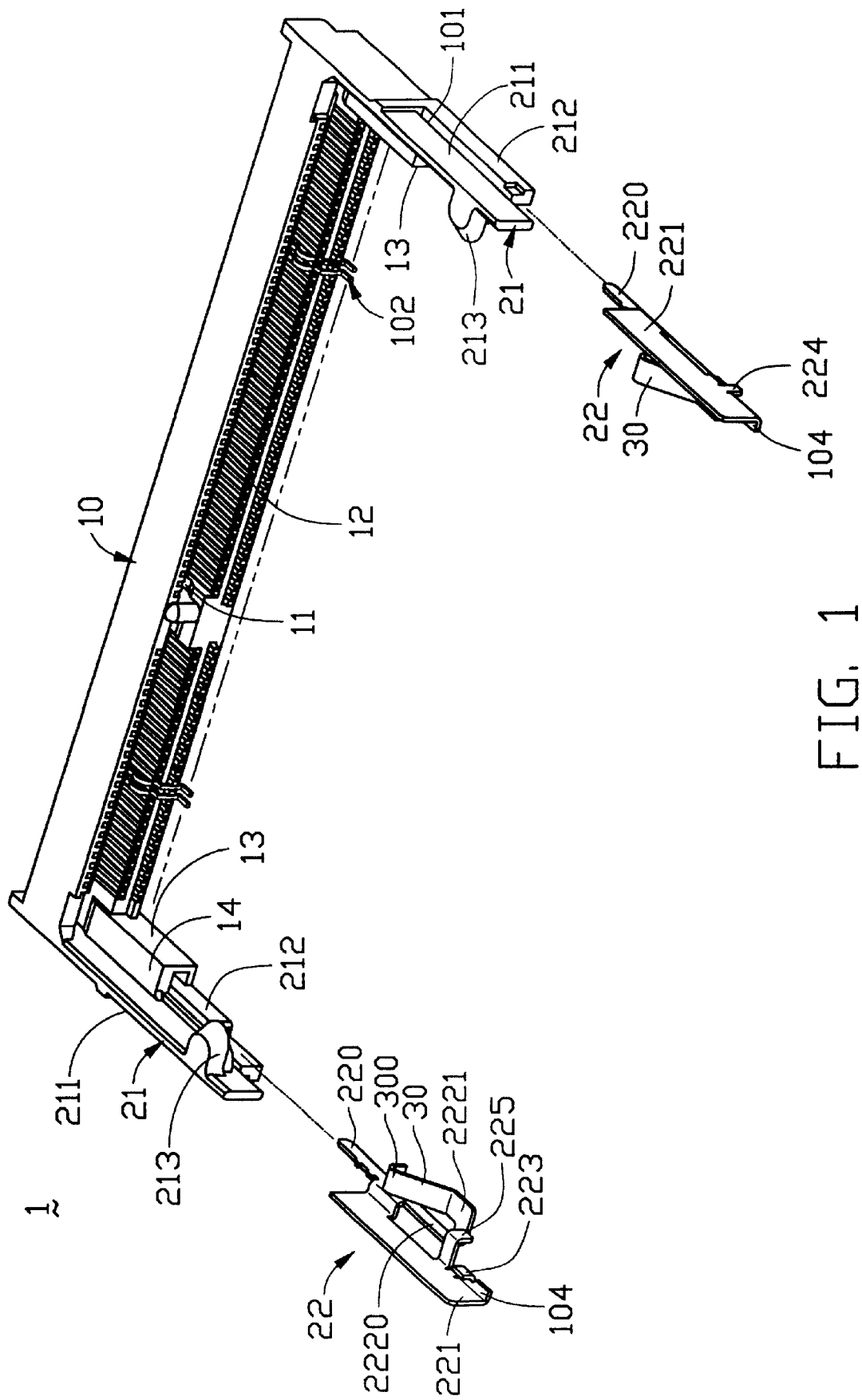
FIG. 1 is an exploded view of a card edge connector constructed in accordance with the present invention.
Figure 2:
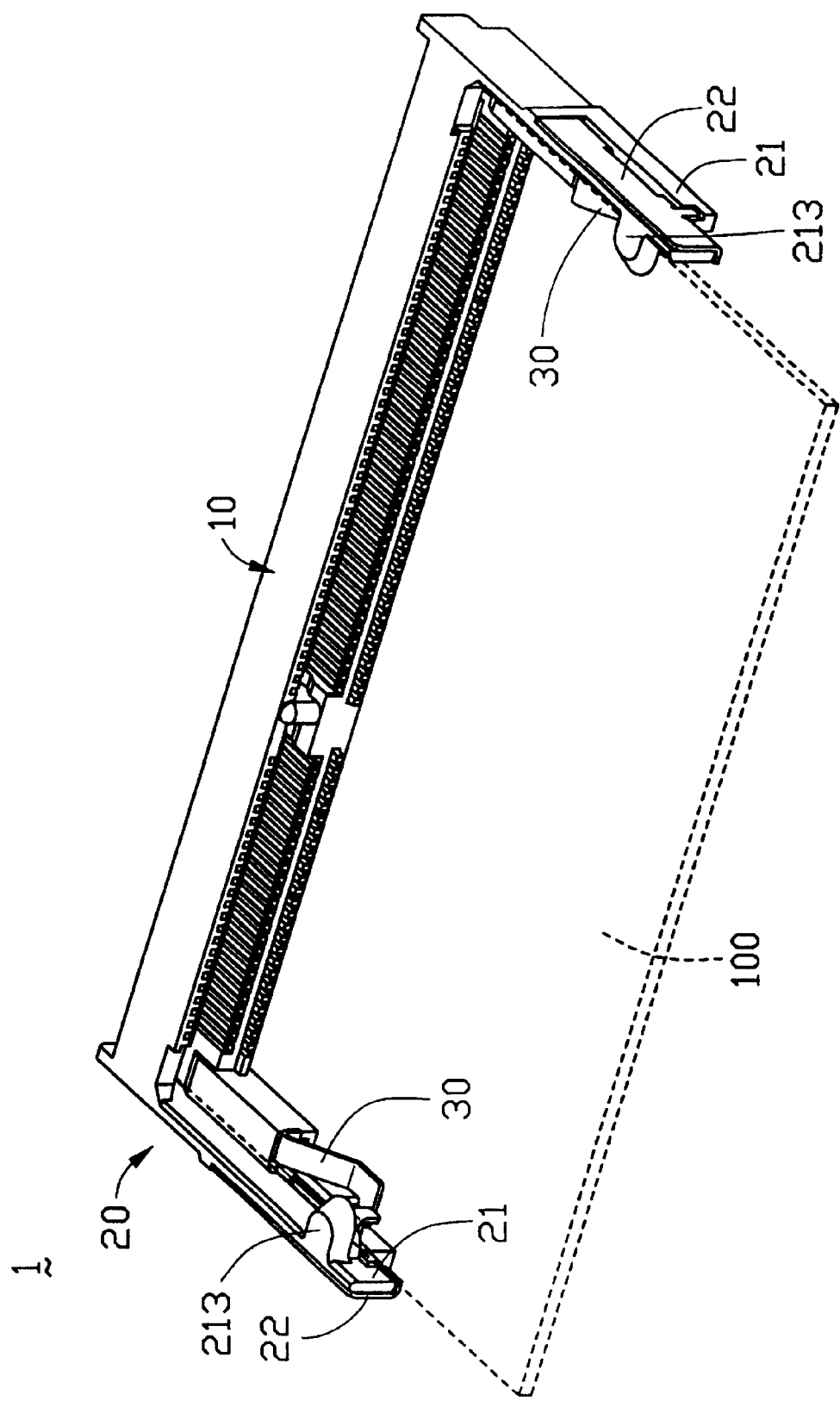
FIG. 2 is a perspective view of the card edge connector of the present invention.

With reference to the drawings and in particular to FIGS. 1 and 2, a card edge connector constructed in accordance with the present invention, generally designated with reference numeral 1, comprises a housing 10 made of an insulative material, such as plastics, with a central slot 11 defined therein for receiving a leading edge of a daughter board 100 (phantom lines of FIG. 2). The housing 10 also defines two rows of passageways 12 receiving and retaining conductive contacts 102 (only some being visible in FIG. 1) on opposite sides of the central slot 11 whereby the contacts 102 are engageable with corresponding conductive pads (not shown) on opposite surfaces of the daughter board 100. The housing 10 can be positioned on a mother board (not shown) with tails of the contacts 102 soldered to the mother board and making the daughter board 100 substantially parallel to the mother board.

Two side arms 21 integrally formed with the housing 10 extend from opposite ends of the housing 10. The arms 21 have inner surfaces facing each other and defining an interior space (not labeled) therebetween for receiving the daughter board 100. The inner surface of each arm 21 forms a platform 13 partially extending into the interior space. The platform 13 has a top face 14 serving as a support of the daughter board 102.

A remote end section of each arm 21 is divided into a relatively flexible portion 211 and a relatively rigid portion 212 by a slit 101 extending along the remote end section. A latch member 213 having a camming surface (not labeled) is formed on the inner surface of the relatively flexible portion 211 for engaging and thus retaining the daughter board 102 in the connector 1.

Figure 3:
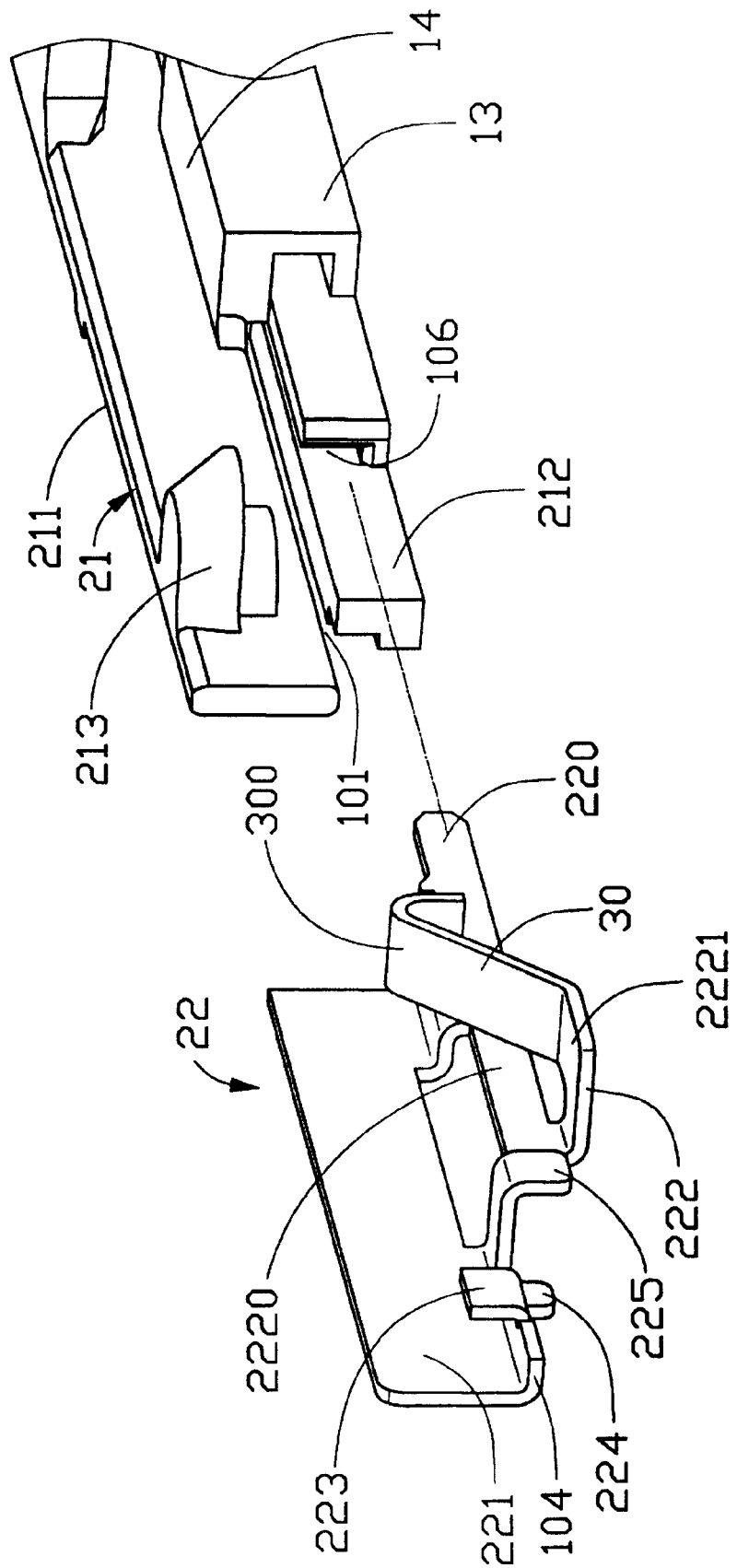
FIG. 3 is an expanded view of a reinforcing device and a portion of a housing of the card edge connector of the present invention.
Figure 4:
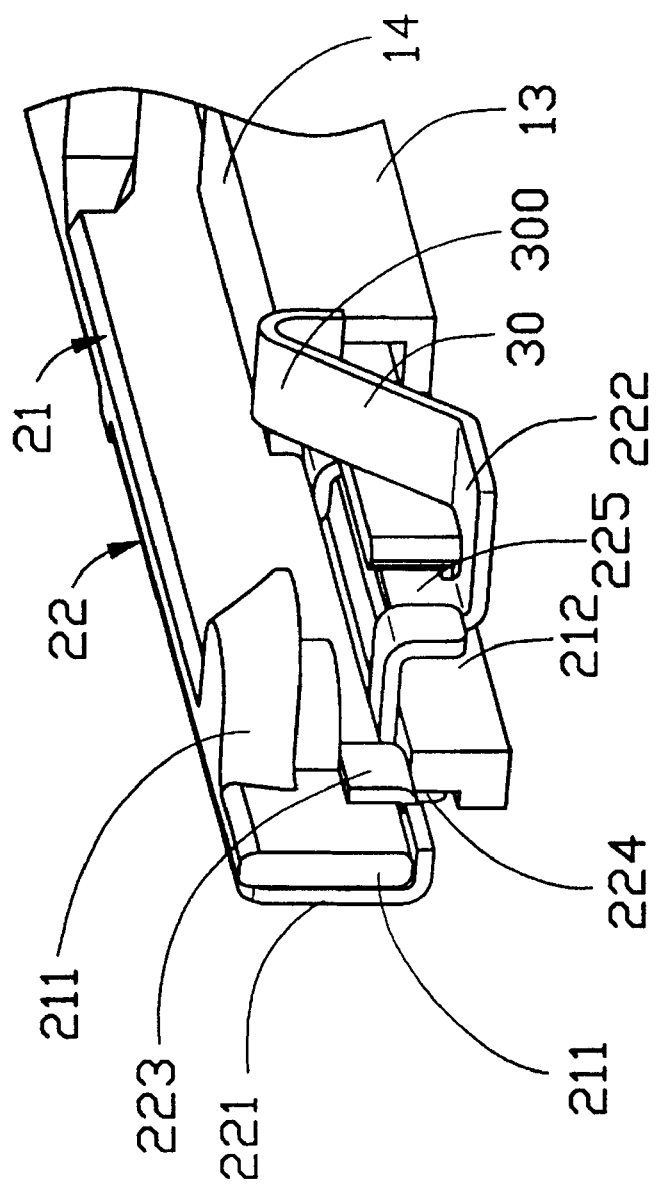
FIG. 4 is an assembled view of FIG. 3.
Figure 5:
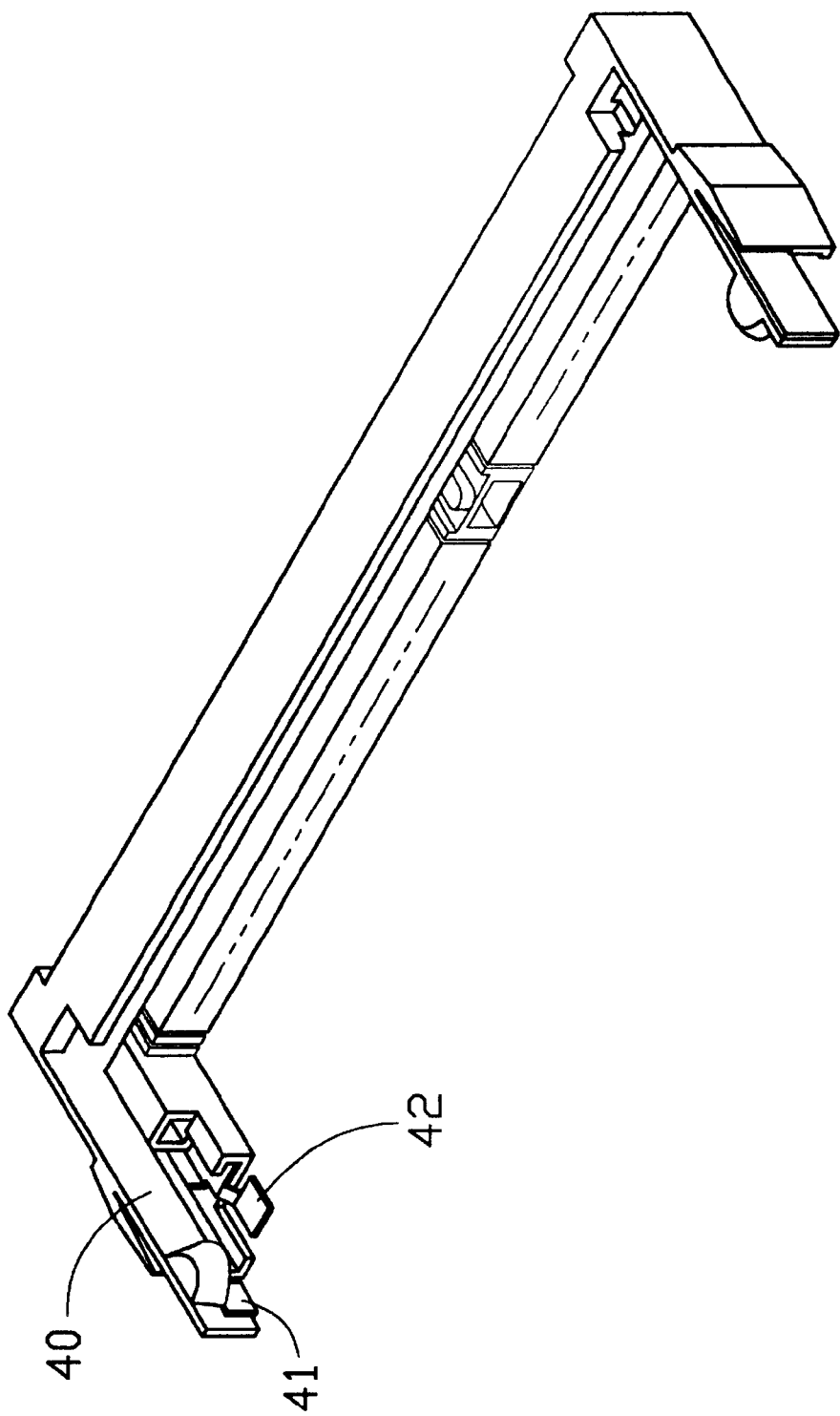
FIG. 5 is a perspective view of a conventional card edge connector.

Also referring to FIGS. 3 and 4, a reinforcing device 22 made of metals is mounted to the remote end section of each arm 21. The reinforcing device 22 comprises a side plate 221 overlapping an outer surface (not labeled) of the relatively flexible portion 211 of the side arm 21 with a bottom flange 104 underlapping a bottom (not labeled) of the relatively flexible portion 211. A securing tab 223 and a barbed tab 220 respectively extends from opposite remote and proximal ends of the bottom flange 104 of the side plate 221. The securing tab 223 is substantially parallel to the plate 221 for partially interposing the relatively flexible portion 21 therebetween and thus attaching the reinforcing device 22 to the relatively flexible portion 211 of the side arm 21. The barbed tab 220 extends from the bottom flange 104 in a direction toward the housing 10 and is press-fit into a slit 106 defined in the relatively rigid portion 212 of the side arm 21 for fixing the reinforcing device 22 to the relatively rigid portion 212 of the side arm 21.

Stop tabs 224, 225 are formed with the reinforcing device 22 and are located on opposite sides of the relatively rigid portion 212 of the side arm 21 for limiting the deflection of the relatively flexible portion 211 with respect to the relatively rigid portion 212 in mounting/dismounting the daughter board 100.

The reinforcing device 22 comprises a grounding/supporting member 222 mounted to the barbed tab 220 by a connection 2220 whereby the grounding/supporting member 222 is substantially located between the remote and proximal ends of the side plate 221 of the reinforcing device 22. The grounding/supporting member 222 comprises a soldering pad 2221 positionable on the mother board for being soldered thereto to provide support and grounding to the mother board. A cantilever type spring arm 30 extends from the soldering pad 2221 in an inclined direction with respect to the soldering pad 2221 toward the housing 10 whereby an obtuse angle is formed between the soldering pad 2221 and the spring arm 30. An arc contact section 300 is formed on a free end of the spring arm 30. The contact section 300 is located close to a remote end of the platform 13 and has an apex projecting above the top face 14 of the platform 13 whereby when the daughter board 100 is inserted into the card edge connector 1 and positioned on the top face 14 of the platform 13, an effective engagement is formed between the contact section 300 of the spring arm 30 and a grounding pad (not shown) of the daughter board 100. A grounding path is thus formed for grounding the daughter board 100.

The cantilevered, inclined arrangement of the spring arm 30 makes the spring arm 30 compliant whereby an engagement between the spring arm 30 and the daughter board 100 can be ensured even when the daughter board 100 is subject to vibration. Further, a reaction force of the spring arm 30 induced by the daughter board 100 positioned thereon helps retaining the daughter board 100 in position against external vibration. It is appreciated that because the spring arm 30 directly extends from the solder pad 2221 which is solderably secured on the printed circuit board, the spring arm 30 owns strong reliable support when it is deflected downwardly by the daughter board inserted into the connector.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An electrical connector for electrically connecting a daughter board to a mother board comprising:

an insulative housing adapted to be mounted to a mother board, the housing defining a central slot for receiving an edge of a daughter board, conductive contacts being retained in the housing and adapted to be connected to the mother board, the contact being arranged for electrically engaging the daughter board to establish electrical connection between the mother board and the daughter board;

two side arms integrally formed with the housing and extending from opposite ends of the housing to define a space therebetween for receiving the daughter board, each side arm having an inner surface forming a platform for supporting the daughter board, a remote end section of each side arm forming a relatively rigid portion and a relatively flexible portion, the relatively flexible portion being deflectable from a first position wherein a latch extending from the relatively flexible portion is adapted to engage and thus retain the daughter board in position inside the connector and a second position where the latch is adapted to disengage and thus release the daughter board from the connector; and a reinforcing device made of a conductive material, the reinforcing device being attached to the remote end section of each side arm and comprising:

a side plate attached to an outer surface of the relatively flexible portion, a retention member formed in a proximal end of the side plate and extending in a direction toward the housing to be secured to the relatively rigid portion for attaching the reinforcing device to the relatively rigid portion while allowing the relatively flexible portion to be deflectable with respect to the relatively rigid portion, and a grounding/supporting member comprising a soldering pad connected to the retention member and being adapted to be positioned on and soldered to the mother board and a spring arm extending from the soldering pad in an inclined fashion toward the housing and forming an arc contact section partially projecting above the platform for effectively engaging and retaining the daughter board; wherein the spring arm forms an inclined cantilever beam; wherein the spring arm and the soldering pad together are adapted to form a grounding path between the daughter board and the mother board.

2. The electrical connector as claimed in claim 1, wherein the reinforcing device comprises a securing tab extending from the side plate for interposing the flexible portion of the side arm between the securing tab and the side plate.

3. The electrical connector as claimed in claim 2, wherein the securing tab is adjacent a remote end of the side plate so as to be spaced from the retention member.

4. The electrical connector as claimed in claim 1, wherein the retention member comprises a barbed extension from the proximal end of the side plate and interferentially fit into a slit defined in the relatively rigid portion of the side arm.

5. The electrical connector as claimed in claim 1, wherein stop tabs extend from the side plate and are located on opposite sides of the relatively rigid portion for limiting the deflection of the relatively flexible portion with respect to the relatively rigid portion.

* * * * *